United States Patent [19]

Stone et al.

[11] Patent Number: 4,652,722
[45] Date of Patent: Mar. 24, 1987

[54] LASER MARKING APPARATUS

[75] Inventors: Joseph J. Stone, Northbrook, Ill.; Leroy V. Sutter, Jr., Culver City, Calif.

[73] Assignee: Videojet Systems International, Inc., Elk Grove Village, Ill.

[21] Appl. No.: 596,898

[22] Filed: Apr. 5, 1984

[51] Int. Cl.⁴ .............................. B23K 26/06
[52] U.S. Cl. ................ 219/121 LS; 219/121 LQ; 219/121 LR; 219/121 LK; 346/76 L
[58] Field of Search ........... 219/121 LS, 121 LM, 219/121 LK, 121 LL, 121 LP, 121 LQ, 121 LR, 121 L, 121 LH; 346/76 L, 108

[56] References Cited

U.S. PATENT DOCUMENTS

| | | | |
|---|---|---|---|
| 3,314,073 | 4/1967 | Becker | 219/121 LR |
| 3,569,993 | 3/1971 | Blin et al. | 219/121 LR |
| 3,965,476 | 6/1976 | Wenander et al. | 346/76 L X |
| 3,982,251 | 9/1976 | Hochberg | 346/75 |
| 4,024,545 | 5/1977 | Dowling et al. | 346/76 L |
| 4,053,898 | 10/1977 | Hirayama et al. | 346/108 X |
| 4,121,222 | 10/1978 | Diebold et al. | 346/75 |
| 4,219,721 | 8/1980 | Kamen et al. | 219/121 LM |
| 4,288,822 | 9/1981 | Hareng et al. | 346/76 L X |
| 4,289,378 | 9/1981 | Remy et al. | 219/121 LS |
| 4,377,736 | 3/1983 | Daunt et al. | 219/121 LS |
| 4,404,571 | 9/1983 | Kitamura | 346/108 |
| 4,532,522 | 7/1985 | Tsunoda et al. | 346/76 L X |

FOREIGN PATENT DOCUMENTS 1499422  3/1970  Fed. Rep. of Germany.

OTHER PUBLICATIONS

IBM Technical Disclosure Bulletin, vol. 17, No. 5, Oct. 1974, "Color Modulated Dye Ink Jet Printer".

*Primary Examiner*—Philip H. Leung
*Attorney, Agent, or Firm*—McDougall, Hersh & Scott

[57] ABSTRACT

Apparatus for inscribing characters or other symbols onto moving articles or substrate. The symbols or characters are defined by a matrix having a predetermined number of rows and columns. The apparatus includes a plurality of individual lasers, each dedicated to write a predetermined character row. Columns are written in sequence as the article passes the laser head. Light energy from the lasers is directed by mirrors to an exit lens which focuses the laser beams onto the articles or substrate to be marked. Separate laser mirrors provide reduction in laser beam spacing thereby facilitating a correspondingly foreshortened laser beam path. The lasers are arranged into two groups and interleaved to form the desired character row spacing without mirror overlap or shadowing.

4 Claims, 7 Drawing Figures

LASER MARKING APPARATUS

The present invention relates to apparatus for marking moving objects or substrates and more specifically to a laser marking system adapted to produce clean, permanent markings on a wide variety of materials. The present apparatus is particularly suited for marking most materials used in food and consumer product packaging, beverage containers, bottle closures, labels, and substrates. Such marking may include date or batch codes, words, numbers, trademarks and company logos.

Non-impact marking or coding equipment is well known to the art and includes ink jet coders, for example U.S. Pat. No. 4,121,222 of the present assignee. Another ink jet arrangement is illustrated in U.S. Pat. No. 3,982,251 wherein a plurality of pulsed ink jets define a character matrix on the substrate as it passes the ink jet head. In the latter patent, the ink droplets are transformed from a colorless transparent state to a visible color state, as desired, by the selective impingement of laser energy while the droplets are enroute from the ink jet head to the marked item. Although ink jet marking provides a highly satisfactory marking system in many applications, for example the marking of paper labels and metal and plastic surfaces; ink jet printing may be inadequate where the background of a preprinted label lessens the visible contrast of the inked marking or where poor adherence of the ink to a nonporous surface compromises marking indelibility. In addition, quality ink jet printers necessarily incorporate sophisticated hydraulic-type conduits, valves, reservoirs and other apparatus to assure proper retention and movement of the inks and solvents common to the ink jet process.

The present invention pertains to the direct laser marking of articles and substrates wherein the above limitations of ink jet marking may be avoided. More specifically, the present laser marking system provides high speed permanent marking on most materials without regard to surface finish, painting, or color. Further, characters of higher resolution and smaller size may be marked using laser technology as compared with the ink jet alternative.

Laser excited marking systems, generally, are known to the art. One such approach, as exemplified by the patents to Wenander, U.S. Pat. No. 3,965,476, and Kamen, U.S. Pat. No. 4,219,721, utilizes a character aperture mask through which the laser light source is passed onto the object to be inscribed. The present arrangement, by contrast, generates dot-matrix character fonts by sharply focusing a plurality of individually modulated lasers onto the article or substrate as it is moved along a linear track adjacent the optical focusing head.

Another commonly employed technique for laser writing involves the scanning of the object surface by directing one or more laser sources against oscillating or rotating mirrors. Kitamura, U.S. Pat. No. 4,404,571, for example, utilizes a rotating polygonal mirror to effectively scan a photosensitive surface. Another example is U.S. Pat. No. 4,024,545 to Dowling in which a pair of mirrors mounted for rocking motion, each about a mutually orthogonal axis, permit a single modulated laser source to scan a rectangular surface area. The previously considered '476 Wenander patent also incorporates a plurality of fixed and moveable mirrors and a lead-screw structure to direct the laser source to the proper paper surface. It will be appreciated that each of these writing structures comprises complex moving mechanical elements which are expensive to build and maintain, slow in operation, and generally define less accurate and distinct characters.

Yet another prior art arrangement is shown in IBM Technical Disclosure Bulletin, Volume 20, Number 6, November 1977, wherein the light output from a plurality of GaAs lasers is combined utilizing optical waveguides and transmitted to a laser head through fiber optic channels. Several fiber optic channels are formed in this manner and are positioned in parallel orientation in the laser head to facilitate printing of a character dot matrix column. Fiber optics, however, have limited power handling capability and, further, cannot be utilized for the transmission of the relatively long wavelength energy from the $CO_2$ lasers of the present invention. In addition, the parallel arrangement of the several optical fibers requires that the surface of the article or substrate to be marked be located in the image plane rather than in the focal plane thereby lowering the available marking energy density. Finally, the exit lens for use with this prior art parallel optical fiber laser head must be of sufficient lateral dimension to intercept each of the light beams from the widely separated laser fibers comprising the full column of the character matrix. This is in contrast to the present invention wherein proper row spacing is a function of the incident angles of a plurality of beams, each focused along a common center axis of the exit lens.

The present laser coding apparatus combines a plurality of individual lasers or a monolithic unit having plural beams into a structure of maximum simplicity and virtually no moving parts. The laser beam from each source is directed by fixed mirrors through a single exit lens and, in turn, onto the surface to be marked. Individual laser mirrors, although adjustable for initial system alignment, are not moved and remain stationary during normal apparatus operation. The surface to be marked is positioned on a conventional conveyor or other device adapted to move the objects along a linear path adjacent the laser output head. Each laser defines an essentially collimated energy source which is focused, by the exit lens, into a dot of predetermined small size for precision marking of article surfaces as they pass the output head substantially in the focal plane thereof. The incident angle of each laser source onto the exit lens is initially adjusted to provide a plurality of closely spaced and focused dots which define a vertical column of light dots from which the usual alpha-numeric matrix can be obtained by modulation of the dots as the article or substrate moves past the exit lens. In this manner, expensive beam scanning mechanisms are avoided.

The present arrangement also avoids the costs and structural complexities associated with laser mask systems and, further, is not limited to the specific fonts defined by the character mask. Indeed, any character or other symbol defineable by a dot or line matrix may be created and marked by the present invention. The definition of individual column dots by discrete modulated lasers offers various other advantages in addition to the reduced mechanical complexity occasioned by the elimination of oscillating, moving, or rotating mirrors. First, lower cost lasers may be employed due to the lesser beam power requirements of the present system in which each beam inscribes only a single row of spots or dots of the character matrix. By contrast, in a single laser scanning system, the laser must output sufficient power to inscribe all of the dots for the character matrix. A related advantage of the present system is increased character writing speed as each laser writes only a small proportion of every character. Similarly, the maximum laser modulating frequency of the invention is reduced by a factor corresponding to the number of lasers used (seven in the preferred embodiment), while achieving comparable marking speed.

It is therefore an object of the present invention to provide a laser marking system suitable for coding paper labels, other substrates, printed matter, plastic, painted surfaces, and the like. The system is adapted to reproduce any symbol or character defineable within a matrix of a predetermined number of dot rows. The character height is set by the focal length of the exit lens and by the incident angles between laser sources. A plurality of lasers is provided, preferably one for each dot defining the vertical column of the symbol display matrix. It is a further object that the mechanical complexities and associated costs of laser beam positioning apparatus be minimized and, therefore, that sophisticated beam scanning arrangements including, for example, oscillating and rotating polygonal mirrors and threaded lead screw drives, be avoided. More specifically, it is a further object to provide laser marking apparatus wherein the items to be marked are passed adjacent the laser head for marking. A further object is the use of relatively inexpensive lasers having lower power output and modulation bandwidth capability. Mirrors may be provided as necessary to direct the various laser beams in proper angular orientation onto the exit lens which, in turn, focuses the beams onto the item to be marked as discrete points. In addition, such mirrors may be utilized to compress the apparent spacing between adjacent lasers thereby facilitating a shorter optical laser path for a given minimum laser spacing and incident light beam angles.

DESCRIPTION OF THE PREFERRED EMBODIMENT

The apparatus of the present invention is adapted to mark or inscribe alphanumeric characters or other symbols onto the surface of moving articles. More specifically, a plurality of laser beams are focused, onto the surface, as discrete dots preferably along a line transverse to the direction of article movement. This line defines a single column of the characters or symbols to be marked. As the article to be marked passes the laser head, each laser describes a track or line on the article surface which defines a corresponding row of the characters marked. In the preferred arrangement of the present invention, the focused laser dots are umiformly spaced thereby forming evenly spaced, parallel character rows.

As discussed below, characters are preferably inscribed by selectively and synchronously pulsing the lasers to produce a vertical line of spaced dots defining one character or symbol column. This pulsing process is successively repeated to produce adjacent columns as the article moves in relation to the laser head and focused beams. In this manner conventional dot matrix characters may be imprinted. Alternatively, the pulse durations may be extended such that each laser defines a plurality of line segments within its associated row on the moving article. These segments may be of arbitrary length.

Figure 1:
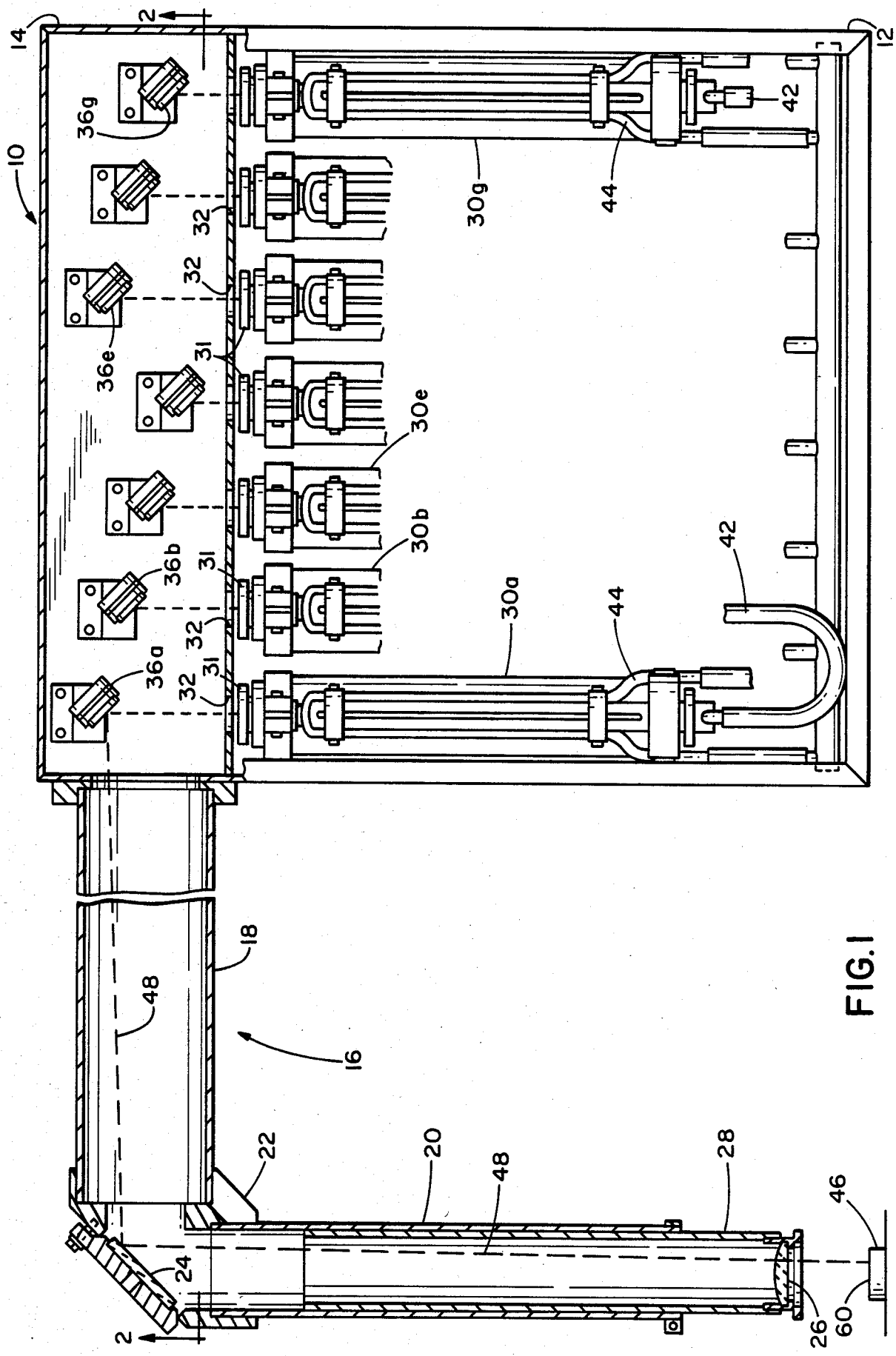
FIG. 1 is a sectional side elevation view of the laser marking apparatus of the present invention.
Figure 2:
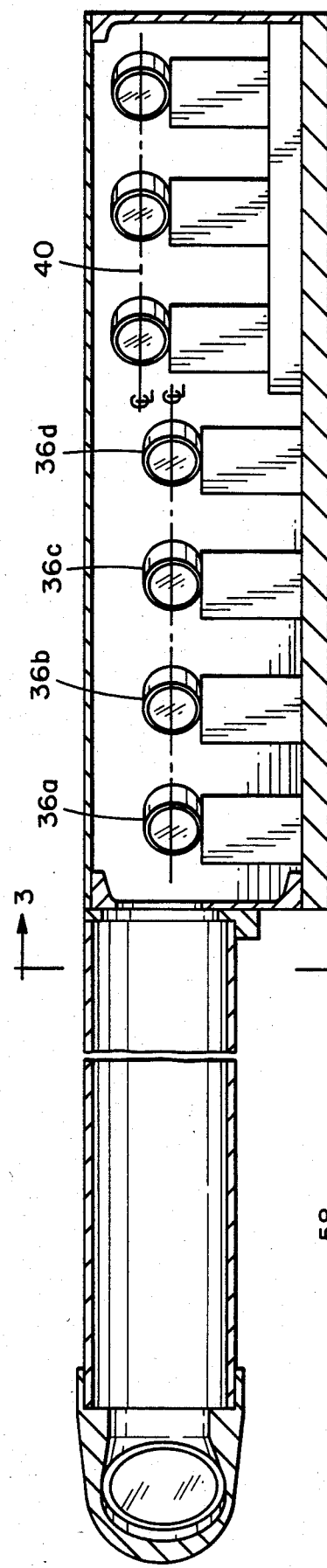
FIG. 2 is a sectional view taken substantially along line 2—2 of FIG. 1 illustrating placement of laser directing mirrors.

Referring to FIGS. 1 and 2, the laser marking apparatus of the present invention includes a main cabinet 10 which is generally defined by a lower laser compartment 12 and an upper mirror compartment 14. Compartment 12 serves to contain the several lasers and, importantly, to provide RF shielding thereby preventing undue radiation from the RF laser excitation source. A laser head 16 is rigidly affixed to compartment 14 of cabinet 10. This head comprises horizontal and vertical delivery tubes 18 and 20, respectively, a right angle interface member 22 having a laser mirror 24 therein, and an exit lens 26 retained at the lower end of lens tube 28 for telescopic focusing movement within vertical delivery tube 20.

In the preferred embodiment seven water cooled $CO_2$ gas lasers 30a–g are arranged vertically within compartment 12 with their respective outputs, i.e. the partially transmitting mirror ends 31, oriented upwardly in FIG. 1. The light beams from these lasers pass through apertures 32 provided in an intercompartment wall 34 and, in turn, impinge upon the respective directing mirrors 36a–g. Lasers 30 are arranged in two groups, 30a–d and 30e–g, for the purpose to be explained more fully below. The light axes of the first group, lasers 30a–d, define a plane substantially in alignment with, and perpendicular to, the center line 38 of mirrors 36a–d (FIG. 2). Similarly, the light axes of the second laser group 30e–g define a plane along the center line 40 of mirrors 36e–g.

Lasers 30a–g direct substantially collimated light beams, having a divergence of approximately 5 milliradians (0.29 degrees), into respective mirrors 36a–g which, in turn, reflect the the beams through delivery tube 18, off mirror 24, through delivery tube 20 into optical contact with exit lens 26. The path of the light beam from laser 30a to marking article 46 is illustrated by the dotted line 48. Unlike the complex counterpart systems known to the prior art, the entire optical path of the present apparatus, including mirrors 36 and 24 and lens 26, is rigidly mounted and does not move during normal marking operations. Mirrors 36a–g are separately adjustable for initial system alignment but do not generally require further movement thereafter. Lens 26 is preferably formed of optically transparent (10.6 micron energy) zinc selenide material. Mirrors 36 and 24 are 'front surfaced' with gold or aluminum and may include a dielectric coating for improved reflective efficiency as is well known to the art.

Lasers 30 are of the continuous wave (CW) $CO_2$ gas variety having a power output capability of about 20 watts average with peak powers of about 50 watts being available. Water cooling jackets and lines 42 interconnecting the several lasers are required at these power levels to maintain proper operating temperatures. In this regard, the present $CO_2$ laser offers substantially higher operating efficiencies as compared with alternative laser sources which advantageously lowers system power and cooling requirements. The present lasers, for example, operate at a power conversion efficiency of approximately 16% as compared with the 1-2% efficiency of a YAG laser. Although $CO_2$ gas lasers have been considered, it will be understood that lasers of differing power levels and wavelengths are contemplated by the present invention.

Each laser 30 is provided with an electrode 44 connected to a pulsed source of RF energy (not shown) which serves to dielectrically excite the respective laser into light emission. A frequency of approximately 27 MHz is utilized for this purpose. As discussed in more detail below, each laser is preferably pulsed to produce a series of dots on the surface defining a character matrix. The duration and intensity of each dot-producing pulse and the pulse repetition rate being determined by the surface material to be marked, the velocity of the conveyor moving the items to be marked past the laser head, and laser cooling considerations. Alternatively, the laser pulse durations may be extended thereby producing characters or symbols defined by a plurality of arbitrary length line segments along the character matrix rows.

Operation of the individual lasers at a pulse envelope power of 20 watts and a 50% duty cycle, i.e. an average laser power of 10 watts, provides high marking speeds without unduly increasing the laser cooling requirements. It will be appreciated, however, that higher power levels can be accommodated if sufficient laser cooling is provided. Such higher levels may be desirable during laser coding of surfaces requiring higher marking energy.

The maximum modulating or pulse repetition frequency of the present RF excited CW $CO_2$ laser is about 10 KHz. However, the use of multiple lasers permits an overall matrix dot writing speed of 70 thousand dots/second. This corresponds to a column spacing of 0.14 mm for a conveyor speed of 1 meter/second. The row spacing is determined, as discussed below, by the incident impingement angles of adjacent laser beams and by the focal length of the exit lens.

The energy required to mark a surface (measured in millijoules per square millimeter, $mj/mm^2$) is a function of surface absorption and other material properties. Printed labels, for example, generally require between about 20 and 40 $mj/mm^2$ unless special printing inks are employed which require only about 10 $mj/mm^2$ for dot marking. Plastic surfaces may require up to 150 $mj/mm^2$ although some plastics may be marked with as little as 20 $mj/mm^2$. Marking of metallic surfaces is difficult due to the high reflectivity of metal to the relatively long 10.6 micron wavelength light output from the $CO_2$ laser. Exposure durations must be increased correspondingly to account for lost reflected laser energy.

Assuming, for example, that the above described laser is operated at a 50% duty cycle, a pulse power of 20 watts, 10Kdots/second/laser, and a dot diameter of 0.01 inches, the energy marking energy per dot may be calculated as follows:

$$\text{Spot Area} = 3.14 \times (d/2)^2 \text{ where } d = \text{diameter}$$
$$= 7.85 \times 10^{-5} \text{ square inches}$$
$$= 5.1 \times 10^{-2} \text{ mm}^2$$
$$\text{Energy per Spot} = \text{Spot Duration} \times \text{Laser Power}$$
$$= (0.5)/10^4 \text{ seconds} \times 20 \text{ watts}$$
$$= 1 \text{ millijoule}$$
$$\text{Spot Energy Density} = \text{Energy per Spot/Spot Area}$$
$$= 1/(5.10 \times 10^{-2})$$
$$= 19.6 \text{ mj/mm}^2$$

Thus, the present apparatus may be operated at substantially its maximum speed to produce up to 70,000×10 mil dots/second on various common surfaces.

It will be apparent, however, that the energy density decreases with the inverse square of the dot diameter and, consequently, pulse durations and pulse reptition rates must be adjusted accordingly. For example, assuming that an energy density of 19.6 $mj/mm^2$, as calculated above, is required for proper marking, and, further, that the dot diameter is increased by a factor of two, to 0.02 inches; the pulse duration must be increased by a factor of 4, to 0.2 milliseconds, and the pulse repetition rate decreased by the same factor to 2,500 dots/second/laser (17,500 dots/second total). Alternatively, a laser having a pulse envelope power of 80 watts, if sufficiently cooled, could be used at the former pulse rate of 18Kdots/second.

Central to the present invention is a marking apparatus having minimum structural complexity and moving parts and, further, an apparatus of compact design. As explained hereafter, these objective s are obtained by the present combination wherein a plurality of individual laser beams are directed and focused, as dots of uniform and predetermined spacing, along a line transverse to the direction of article movement. More specifically, individual laser mirrors 36 serve, in part, to reduce the effective inter-beam spacing thereby effecting a corresponding substantial reduction in the beam path length and overall apparatus size. Further, the mirrors and lasers are arranged in interleaved fashion to avoid beam shadowing while maintaining the close beam separation required to achieve predetermined dot spacings in a machine of compact design.

It will be appeciated that the individual laser beams must be aligned both in the transverse or vertical direction to provide the selected inter-dot or row spacing and, further, in the lateral or longitudinal direction to produce collinear dot columns from the synchronized lasers. Both transverse and lateral dot alignment will be considered, in turn, with respect to the above described structure.

Figure 5:
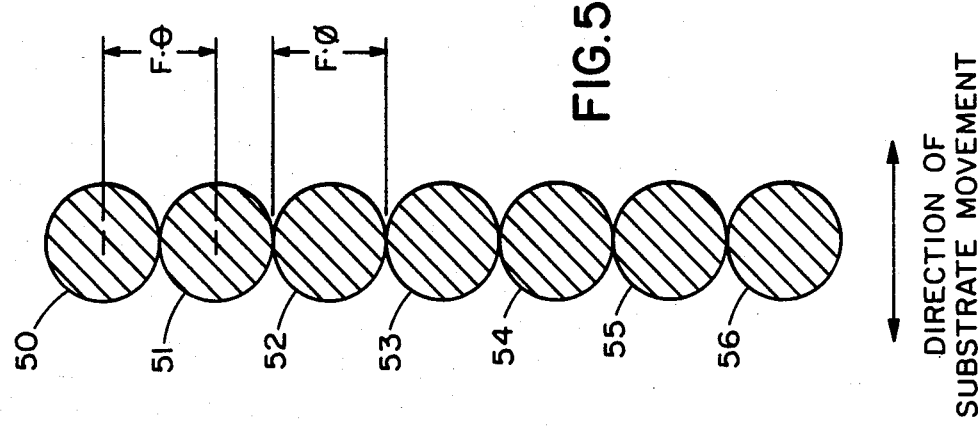
FIG. 5 is a magnified representation of the focused dots produced by the present laser marking system illustrating the appropriate dot size and interdot spacing lineal relationships.

FIG. 5 represents seven adjacent dots 50–56 comprising the single column written at a given instant of time by the present apparatus. As previously indicated, sequential adjacent columns may be written to form a character matrix as the article being marked moves past the marking apparatus. Each of the dots 50–56 comprise one point within a distinct character row which is written onto the moving article. Each dot of FIG. 5, and the row it represents, is written by one of the lasers 30a–g. As explained below, the adjacent dots 50–56 are not formed, respectively, by adjacent lasers in the order shown, i.e. lasers 30a–g. Rather, the respective laser groups are interleaved such that a given laser group writes every other dot along the vertical character column. Therefore, dots 50-56 are written, respectively, by lasers 30a, 30e, 30b, 30f, 30c, 30g, and 30d. This corresponds to the left-to-right order of the mirrors as viewed in FIG. 3.

Figure 3:
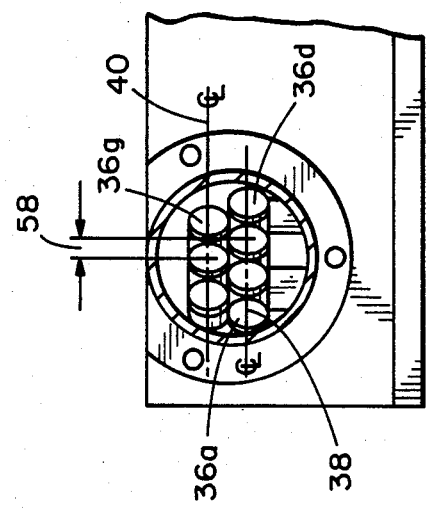
FIG. 3 is a sectional view taken substantially along line 3—3 of FIG. 2 depicting the relationship of the individual laser directing mirrors as seen through the delivery tube.
Figure 4:
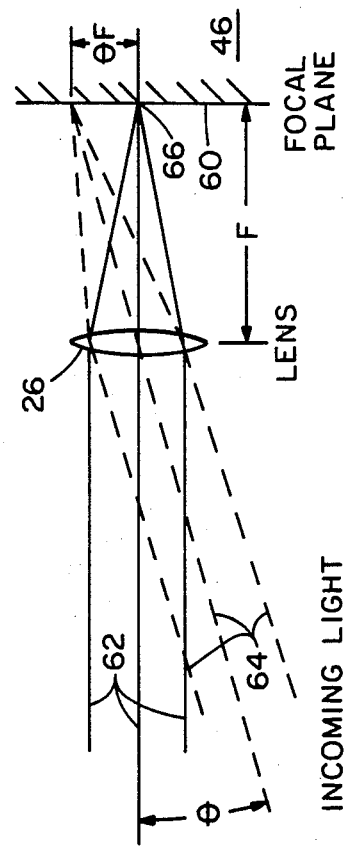
FIG. 4 is a schematic elevation view representation of the laser optical relationships of the present invention.

FIG. 4 depicts the optical relationships pertaining to an exit lens 26 having a focal length 'F'. In normal operation, articles 46 are passed adjacent the laser head such that the surfaces 60 to be marked are positioned substantially within the focal plane of the exit lens. The solid lines 62 represent a light beam from any given laser 30 and mirror 36 combination while the dotted lines 64 depict a similar beam from the next adjacent laser and mirror as shown left-to-right in FIG. 3. Thus, for example, if lines 62 define a beam eminating from mirror 36b; then, lines 64 represent a laser beam from either mirror 36e or 36f.

The exit lens 26 focuses, in conventional manner, incident parallel light rays to single point in the focal plane while causing incident light rays converging on the lens to diverge at the same relative angle. Thus, the rays 62, which as depicted are parallel, illuminate a single dot or point 66 on surface 60 while rays 62 and 64 converging at an angle $\theta$ on the lens, diverge therefrom at that same angle. Therefore, the spacing between adjacent dot is determined by the well known relationship that arc length is the product of arc radius and arc angle as follows:

Vertical Dot Spacing = $F \cdot \theta$ where F is the arc radius or focal length of the lens; $\theta$ is the arc angle in radians; and, the dot spacing is substantially identical to the arc length product (see FIG. 4). It will be appreciated that the height of the character font may readily be altered by substituting exit lenses of appropriate focal length.

As noted, the transverse or vertical inter-dot spacing is a function of the relative incidence angle, $\theta$, between adjacent laser beams impinging the exit lens. This angle may be approximated by the same arc/radius length relationship considered above as follows:

$\theta = d/l$ where 'd' is the lateral spacing between adjacent laser beams at a given arc radius or beam length and 'l' is that beam length. It can be seen that, absent the beam foreshortening of the present invention, the minimum spacing between adjacent beams is determined by the physical diameters of the lasers which, consequently, results in a corresponding minimum beam length, l, for a predetermined incident angle, $\theta$. An important feature of the present mirror arrangement, however, is the apparent compression of the lateral beam spacing, d, which permits a corresponding reduction in the overall length of the beam path. By positioning the mirrors as shown in FIGS. 2 and 3, an apparent relatively close spacing 58 between adjacent beams may be achieved without regard to the actual inter-laser mounting distance. In this manner, a substantially reduced path length 48 can be achieved without compromising the desired angular relationships of the incident light sources. Mirrors 36a–g are uniformly spaced a distance 58 in the vertical direction thereby uniformly spacing the character dot rows (see FIG. 3).

As previously noted, the lasers and associated mirrors are divided into a first group, a–d, and a second group, e–g, in which the respective laser and mirror axes lie within a given plane. This arrangement is required to alleviate mirror shadowing of adjacent laser beams that would otherwise result if all seven mirrors 36 were placed along a single axis. Referring to FIG. 3, the relationships between the seven mirrors within their respective two planes can be seen. It will readily be appreciated that substantial mirror overlap, with its concomitant beam shadowing, would occur were the seven mirrors to be merged into a single row or plane.

Although the mirrors may, physically, be separated to avoid overlap; such increased lineal spacing necessarily results in a correspondingly increased incidence angle, $\theta$, between adjacent light beams which, as discussed, translates into a proportionately increased character height.

As disclosed, the positioning of lasers and associated mirrors in multiple planes facilitates an overall reduction in apparatus size while simultaneously avoiding beam shadowing which would otherwise occur due to close mirror spacing. It must be observed, however, that the exit lens 26 is circularly symmetric about its axis and, therefore, that inadvertent lateral angular beam displacements induce lateral misalignments in the same manner as deliberate vertical off-setting produces vertical dot spacing. As it is desired to achieve colinear vertical character columns, lateral dot off-sets must be compensated or eliminated.

Figure 7:
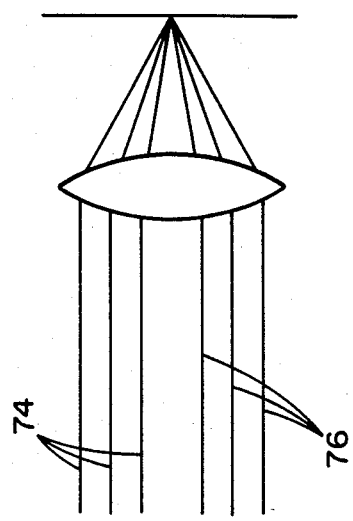
Figure 6:
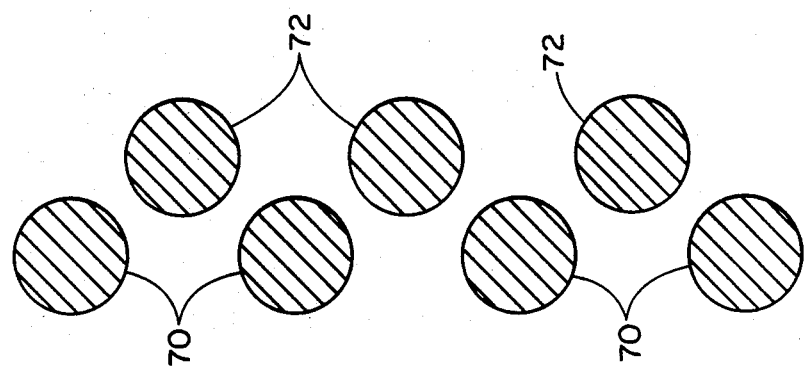
FIG. 6 is a representation of the dot pattern resulting from the present grouped laser arrangement without horizontal compensation; and, FIG. 7 is a schematic plan view representation of laser alignment compensating for horizontal alignment.

If compensation is not utilized, the lateral off-set between mirror center axes 38 and 40 results in the column dot pattern of FIG. 6. Dots 70 are formed by the lasers and mirrors lying in the plane of axis 38 while dots 72 result from the corresponding sources defined by axis 40. The preferred arrangement for effecting horizontal compensation is illustrated in FIG. 7 in which rays 74 generally depict laser beams impinging from the sources along axis 38 while rays 76 similarly represent the beams from the axis 40 sources. The laser beams, rather than being directed in converging fashion to the center of the lens, are deliberately aligned in parallel relationship with respect to the vertical plane thereby striking the lens along its horizontal axis left and right of the vertical axis, respectively. Since rays 74 and 76 are in parallel relationship with respect to a vertical plane, exit lens 26 focuses these rays along a single vertical line thereby defining a colinear character column.

Alternatively, the lasers may be focused onto the center of the exit lens and the respective laser groups pulsed in timed sequence to effect alignment thereof. Thus, the second group of lasers are not pulsed until the article, previously marked with the first group of dots, has moved such that the first dot group is in colinear alignment with the vertical axis defining the second group. It will be appreciated that the former arrangement is preferred because it avoids sequential timing circuitry and alignment problems by permitting the lasers to be simultaneously pulsed.

Although highly collimated, the light output from lasers 30 is not absolutely parallel, but rather, diverges at a known small angle, $\phi$, of approximately 5 milliradians. Therefore, the light from a given laser 30 does not focus to a point of infinitesimal size, but advantageously, to a finite dot or spot of visible proportions. The diameter of each dot is determined by the identical relationships defining dot spacing; namely, dot diameter is the product of the beam divergence angle, $\phi$, and the focal length as follows:

Dot Diameter = $F \cdot \phi$.

For example, with a typical focal length of two inches and a beam divergence of 5 milliradians, a dot diameter of 10 mils results:

Dot Diameter = 2 inches × 0.005 radians

= 0.010 inches

Referring to FIG. 5, the individual dots 50–56 are shown in adjacent tangent relationship wherein the inter-dot spacing is equal to the dot diameter. In such a configuration, the relative laser convergence angle $\theta$ must be set equal to the individual beam divergence angle $\phi$ of the lasers selected.

If desired, of course, the inter-dot spacing can be chosen to produce spaced or overlapped dots instead of tangent ones.

It will be appreciated that variations in the above described embodiments are contemplated within the spirit of the compact, mechanically streamlined marking apparatus of the present invention including, for example, differing number of types of lasers, greater or fewer laser/mirror planes, or differing laser head delivery tube configurations.

What is claimed:

1. A laser apparatus for marking indicia onto a substrate comprising:
    (a) a plurality of lasers, each generating a beam of coherent energy of sufficient energy to mark the substrate by permanent alteration of the surface thereof;
    (b) a delivery tube through which the energy beams travel;
    (c) an exit lens deployed at the end of the delivery tube remote from the lasers and onto which the energy beams are directed for focusing onto said substrate positioned at the focal plane of the lens;
    (d) relfecting means for directing the energy beams from the lasers to the exit lens and including means for reducing the spacing between energy beams to minimize the length of the beam path and the corresponding length of the delivery tube.

2. A laser apparatus for marking or inscribing characters onto a substrate by permanent alteration of the surface thereof comprising:
    (a) an exit lens having a focal length, the surface of the substrate to be marked being positioned generally at the focal plane of the lens;
    (b) a plurality of lasers arranged such that their energy output beams are oriented in a generally parallel relationship;
    (c) means for directing the output beams from the lasers onto the center of the exit lens at predetermined angles between said beams thereby to form a column of spots on the substrate, the position of the spots on the substrate being determined by the angular difference between the beams.

3. The laser marking apparatus of claim 2 in which the means for directing the energy output beams at predetermined angles includes a mirror positioned along the beam path of each laser, the mirrors oriented to reflect the beams at said predetermined angles.

4. A laser apparatus for marking indicia onto a substrate comprising:
    (a) a plurality of lasers, each generating a beam of coherent energy of sufficient intensity to mark the substrate by permanent alteration of the surface thereof, the lasers being arranged in at least two groups, the beams from each group defining a plane;
    (b) an exit lens deployed in the path of the beams onto which the energy beams are directed for focusing onto said substrate positioned at its focal plane;
    (c) means for directing the energy beams onto the center of the exit lens at predetermined angles between said beams thereby to form a column of spots on the substrate, the position of the spots on the substrate being determined by the angular difference between the beams, whereby the exit lens focuses each group of beams into a column of spots at its focal plane.

* * * * *